April 22, 1947.   E. G. EGGLESTON   2,419,344
PORTABLE BARBECUE
Filed July 9, 1943   2 Sheets-Sheet 1
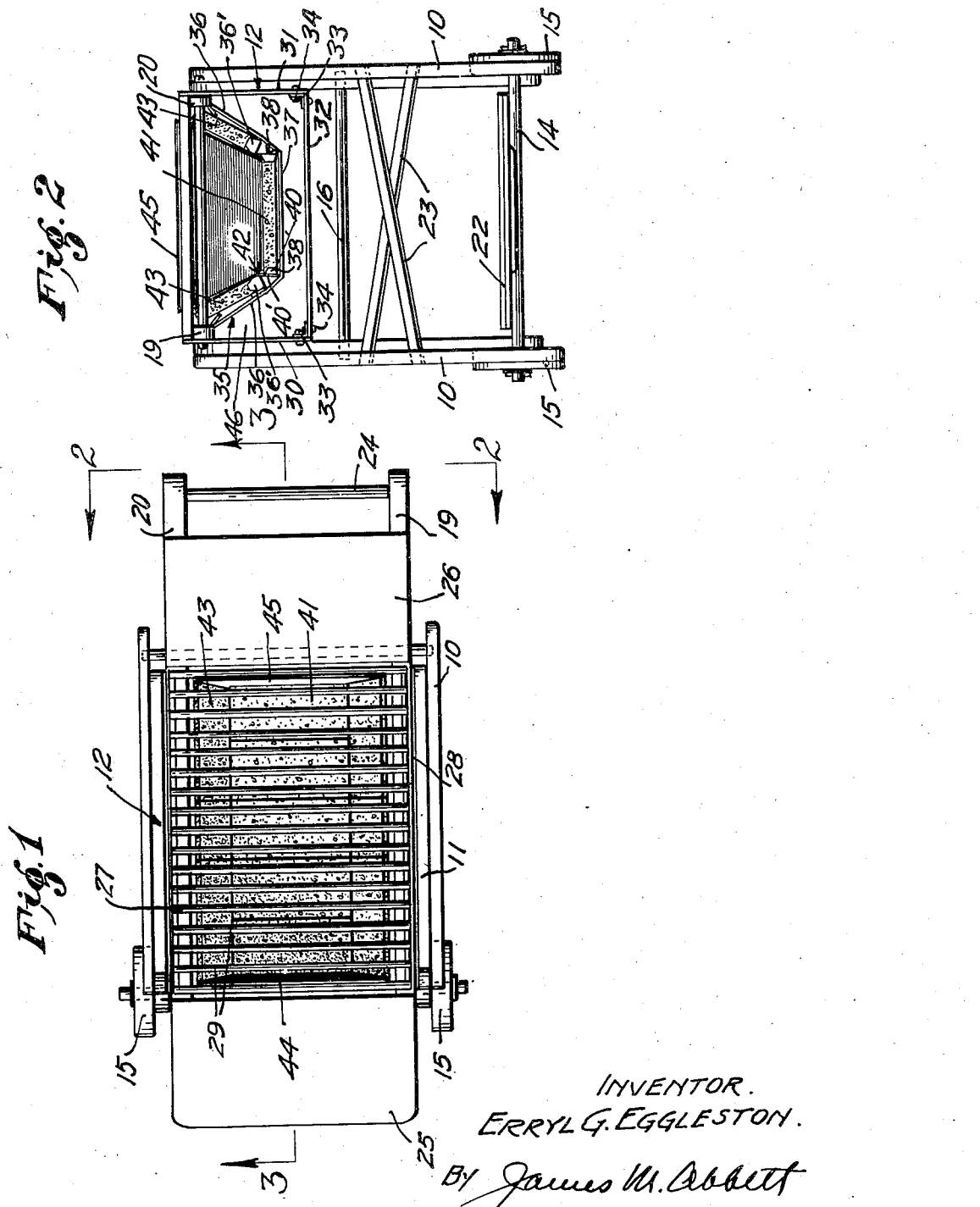
INVENTOR.
ERRYL G. EGGLESTON.
By James M. Abbott
ATTY

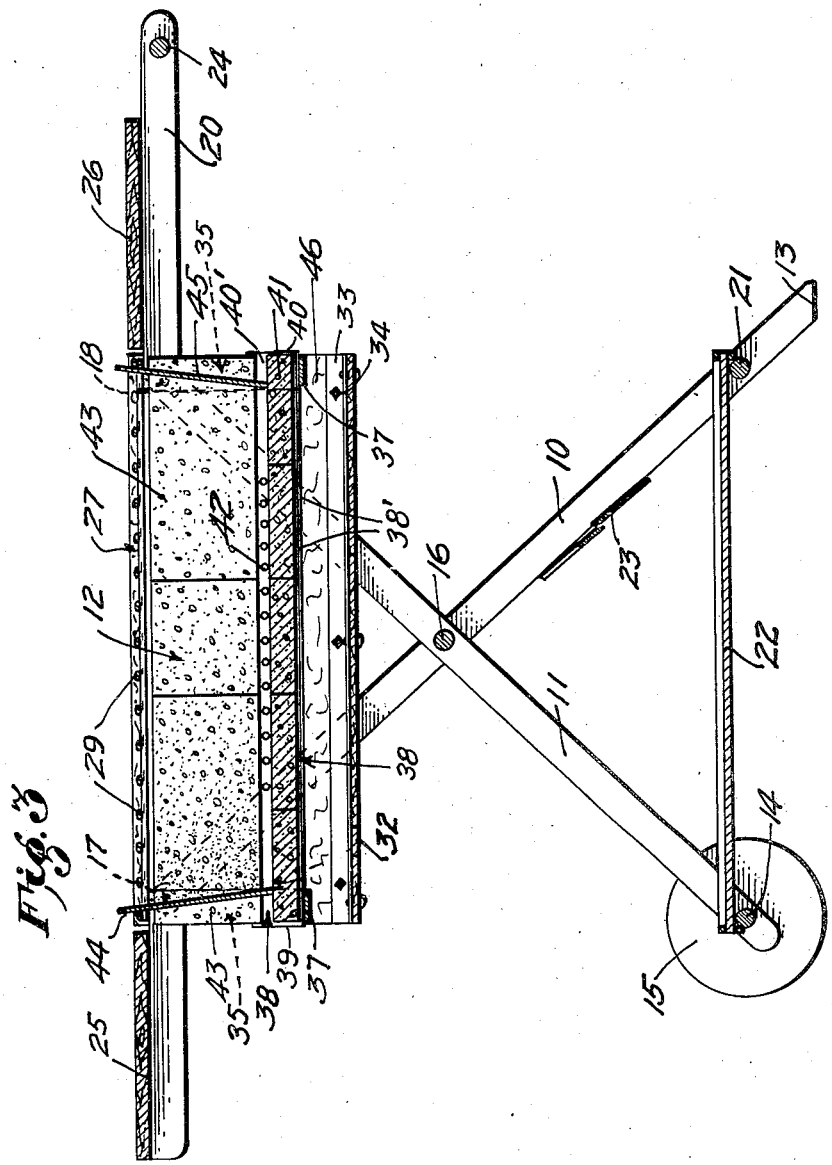

Patented Apr. 22, 1947

2,419,344

UNITED STATES PATENT OFFICE 2,419,344

PORTABLE BARBECUE

Erryl G. Eggleston, South Gate, Calif.

Application July 9, 1943, Serial No. 494,099

7 Claims. (Cl. 126—25)

This invention relates to a cooking device and particularly pertains to a portable barbecue.

Various types of barbecue structures have appeared on the market and have had popular sale. These for the most part have been made of metal, and since metal has now become a critical war material, it is necessary to design a portable barbecue structure which is fire-proof and will provide a convenient grill and fire-box requiring a minimum amount of metal in its construction, and which structure is provided with novel means whereby the device is portable when in its erected position and may be easily folded into a compact bundle for transportation. It is the principal object of the present invention, therefore, to provide a portable barbecue which is essentially non-metallic in its construction, and which includes a fire-proof fire-box and grill so mounted within the device as to provide adequate and convenient space for necessary cooking operations, and which structure may be easily collapsed to a folded position for transportation.

The present invention contemplates the provision of a frame structure including supporting means and running gear, and which frame structure provides a support for a non-metallic fire-box lining, a grill, and means for inducing a desirable draft in the fire-box.

The invention is illustrated by way of example in the accompanying drawings in which:

Figure 1 is a view in plan showing the portable barbecue.

Figure 2 is a view in end elevation showing the relation of the supporting structure of the barbecue to the fire-box.

Fig. 3 is a view in central vertical section through the barbecue, as seen on the line 3—3 of Fig. 1.

Referring more particularly to the drawings, 10 and 11 indicate legs of a supporting structure designed to carry a barbecue pot or fire-box 12. The leg 10 is formed with a flat foot 13, while the leg 11 carries a transverse axle 14 upon which wheels 15 are mounted. The circumference of the wheel 15 and the face of the foot 13 are in the same horizontal plane so as to support the barbecue pot 12 in a horizontally level position. The legs 10 and 11 are arranged in pairs at opposite sides of the barbecue pot 12 and are pivoted together on a cross-rod 16. The upper ends of the legs 10 and 11 are engaged by bolts 17 and 18, respectively, by which the legs are connected to horizontal rails 19 and 20. The rails 19 and 20 are parallel to each other and are spaced from each other to extend along opposite sides of the barbecue pot structure generally indicated at 12.

Attention is directed to the fact that when the bolts 17 and 18 are disconnected from the rails 19 and 20 the supporting structure may be collapsed. The lower ends of the legs 10 are cross connected by a rod 21 which is on the same horizontal plane with the axle 14 of the wheels 15 and will support a removable tray 22. The legs 10 are also secured together rigidly by cross bracing 23.

The horizontal rails 19 and 20 are connected at one end by a cross-rod 24. This rod serves as a handle by which the portable barbecue may be manipulated. Resting upon the rails 19 and 20 adjacent opposite ends thereof are table leaves 25 and 26. These leaves provide a convenient surface upon which articles to be cooked may be placed as well as containers for condiments and other ingredients. The leaves are spaced a distance from each other to accommodate a grill 27. The grill includes an outer rectangular frame 28 and cross-rods 29. The frame fits the space between the leaves 25 and 26 and is of a width substantially agreeing with the overall width of the rails 19 and 20 so that the grill can rest directly thereupon. It is to be understood that the supporting structure, the rails and the table leaves are made of non-metallic material, such as wood, and that the grill is made of metallic or vitreous material. In fact, it has been found desirable to construct the grill of a glass substance known as "Pyrex," since this material resists heat and has the peculiar characteristic of preventing the meat from sticking thereto while it is being grilled.

The outer confines of the fire-box 12 are delineated by opposite side panels 30 and 31 and a floor panel 32. These panels are secured together at their corners by angle bars 33 and bolts 34. The bolts may be unfastened in the event the structure is to be folded. Secured from the upper faces of the side panels 30 and 31 are hanger straps 35. These straps have portions extending downwardly and inwardly, as indicated at 36, and a transverse portion 37 extending horizontally. The straps are made from light gauge metal. As shown in Fig. 3 of the drawing two of these straps are provided, one at each end of the fire-box. The straps are connected by longitudinally extending elements 38 of angle section. The angle elements 38 thus provide a horizontal flange 38′ and a vertical flange 40′. At the ends of the flange portion 40′ of the element 38 tangs 39 and 40 occur. The flanges 38′ of the angle elements 38 rest upon the transverse horizontal portions 37 of the hangers 35. A plurality of floor fire bricks 41 rest directly upon the flanges 38′ and their horizontal movement is limited by the vertical flanges 40' and the end tangs 39 and 40. These fire bricks are formed of a length agreeing with the space between the vertical flanges 40' of the members 38 and of a width so that a multiple of the bricks will substantially fill the distance between tangs 39 and 40 and agreeing substantially with the length of the panels 30 and 31. The vertical flange 40' of each of the elements 38 is of a height greater than the thickness of a fire brick so that it will project above the floor produced by the fire bricks 41 and will permit a plurality of perforations 42, which are formed through the flanges 40', to occur above the level of the floor for the purpose of draft. The portions 36 of the hangers 35 incline downwardly and inwardly and receive a plurality of side bricks 43 which rest upon angle members 36' extending longitudinally at a level above the line of perforations 42 in the flanges 40'. This makes it possible for air to pass into the fire-box above the floor represented by the bricks 41 and beneath the bricks 43. The vertical width of the bricks 43 is such as to form a fire-box directly beneath the grill 27 and in a manner to protect the outer fire-box panels 30, 31 and 32. It is to be understood that the angle elements 36' and 38 may be secured to the hangers 35 in any suitable manner, such as by welding.

The fire-box, as here shown, is open at both of its ends, since there are no end panels closing the ends described by the panels 30, 31 and 32. This provides a space for a fire of an area substantially agreeing with the area of the grill 27. However, the fire-box is provided with end plates 44 and 45 which have perimeters agreeing with the configuration of the cross-section of the fire-box as defined by the fire bricks 37 and 43. These plates are preferably made of light-weight sheet metal and may be inserted between the transverse rods 29 of the grill in order to define a fire-box of any desired area. Thus, a large fire may be made within the fire-box or the movable partition plates may be inserted between grate bars 29 to define a smaller space in which the fire can be made, while the remaining portion of the grill may receive food to be kept warm.

In operation of the present invention the portable barbecue is assembled as shown in Figs. 1 to 3 of the drawings, and when the bolts 17 and 18 are fastened to hold the supporting legs 10 and 11 with relation to the rails 19 and 20 the structure will be ready for use. In the event it is desired to move the assembled barbecue from place to place the handle bar 24 may be gripped to lift the feet 13 of the legs 10 from the supporting surface so that the entire assembled structure may be moved on the wheels 15. A fire may be started on the floor of the fire-box as defined by the fire bricks 41 and air to support combustion will flow inwardly and upwardly through the perforations 42. Attention is directed to the fact that an appreciable space occurs between the fire bricks and the side and floor panels 30, 31 and 32 so that a free circulation of air may flow through the space 46 around the outside of the fire bricks to maintain the fire-box relatively cool and to provide a free draft to support combustion.

When it is desired to transport the barbecue from place to place the grill may be lifted out of its seat, after which the fire bricks 41 and 43 may be removed. Then, the bolts 17 and 18 can be unfastened to permit the legs 10 and 11 to collapse into a folded position. If desired, both of the bolts 17 and 18 may be removed, after which the fastening bolts 34 may be detached so that the supporting hangers 35 and the side panels 31 and 32 can be folded together to make a relatively small package.

It will thus be seen that the invention here disclosed is simple in its construction, provides a portable barbecue which requires only a minimum amount of metal, and which structure can be moved from place to place in its assembled condition or packed in a relatively small space for transportation, the structure having the further advantage of providing a fire-box, which while supported from non-metallic parts will not over-heat and will at the same time provide sufficient draft to support combustion of material within the fire-box.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A portable barbecue, including a fire-box structure formed with a substantially horizontal bottom panel, substantially vertical parallel side panels extending upwardly from the opposite side edges of the bottom panel, a grill disposed over the space defined by the side panels and the bottom panel, the opposite ends of the structure formed by the panels being open, a frame structure disposed within the space defined by said panels and spaced therefrom, and side and bottom refractory elements carried by the frame structure to form a lining for the fire-box.

2. The structure of claim 1 including air openings through the side walls of the lining adjacent the upper surface of the bottom refractory elements.

3. The structure of claim 1 including removable end panels extending transversely between the side refractory elements for closing the ends of the fire-box lining and for optionally defining the length of the fire-box.

4. A portable barbecue, comprising a supporting structure, a fire-box supported thereby including a pair of spaced side wall panels and an intermediate floor panel, the panels being of non-metallic material, hangers supported from opposite sides of the side panels, said hangers having a central horizontal section and upwardly and outwardly extending vertical sections, longitudinal elements connecting said hangers, a plurality of refractory units supported upon said longitudinal members to form a lining for the fire-box, a plurality of refractory units disposed at each side of said first named units to form side wall linings for the fire-box, said linings resting upon the longitudinally extending members, and perforations through the longitudinally extending members between the side walls and the floor.

5. The structure of claim 4 including a grill disposed over the top of the structure thus formed, and partition elements adapted to be inserted between rails of the grill to define the opposite ends of the fire-box.

6. The structure of claim 4 including side rails secured to said side panels and projecting from the opposite ends thereof, and a pair of table leaves, one mounted on the projecting side rails at each end of the grill.

7. The structure of claim 4 including side rails secured to said side panels and projecting from the opposite ends thereof, a pair of table leaves, one mounted on the projecting side rails at each end of the grill, a running gear associated with the support, and a handle carried by the projecting ends of the rails at one end of the grill to manipulate the structure.

ERRYL G. EGGLESTON.

REFERENCES CITED

The following references are of record in the file of this patent:

UNITED STATES PATENTS

| Number | Name | Date |
| --- | --- | --- |
| 1,853,319 | Polhemus | Apr. 12, 1932 |
| 222,676 | Dembrun | Dec. 16, 1879 |
| 1,778,330 | Mayer et al. | Oct. 14, 1930 |
| 666,793 | Benson | Jan. 29, 1901 |
| 466,640 | Wagner | Jan. 5, 1892 |